May 12, 1964

H. W. MULCAHY 3,132,748

FRICTION SHOCK ABSORBER

Filed Oct. 22, 1962

INVENTOR.
Harry W. Mulcahy
BY
Atty.

United States Patent Office 3,132,748
Patented May 12, 1964

3,132,748
FRICTION SHOCK ABSORBER
Harry W. Mulcahy, Chicago Heights, Ill., assignor to W. H. Miner, Inc., Chicago, Ill., a corporation of Delaware
Filed Oct. 22, 1962, Ser. No. 231,884
8 Claims. (Cl. 213—32)

This invention relates to improvements in friction shock absorbing mechanisms, or draft gears for railroad vehicles, and more particularly to means for maintaining such mechanisms is assembled relationship prior to installation thereof.

A popular form of friction shock absorber or draft gear that has existed for some time comprises a wedge surrounded by a plurality of friction shoes that are in turn received in a cylindrical casing. Springs within the casing urge the wedge and shoes into protruding relationship with the open front end of the casing. The entire unit is adapted for installation in a "pocket" such as is provided in railway draft riggings. When in use, the wedge and casing are held in place between front and rear followers that define the pocket; but prior to installation other means must be provided to maintain the assembled relationship of the gear parts. Commonly, inwardly projecting lugs are provided at the front of the casing, and matching outwardly projecting lugs are provided on the wedge. In the assembled gear, each pair of matching lugs is urged into engagement by the action of the springs on the shoes and wedge, and each such pair of lugs is disposed between adjacent shoes to prevent relative rotational displacement that might disengage the lugs.

In the above type of draft gear the diametrical size of the spring that may be inserted in the casing through its open end is limited by the inward projection of the casing lugs. In addition, the fabrication of the wedge and casing is complicated by the necessity of providing the lugs. For these and other reasons, an economical and effective retaining means that would permit the elimination of these lugs and permit the use of a maximum diameter spring, with its attendant higher spring capacity, has been considered desirable. Finally, the present invention, and in particular the preferred embodiment thereof which is herein illustrated and described, has provided a solution to the problem.

Therefore, it is an object of this invention to provide a friction shock absorbing mechanism, especially adapted for railway draft riggings, comprising a friction casing, friction shoes slidingly telescoped within the casing, a pressure transmitting wedge having wedging engagement with the shoes to spread the same apart, and spring means within the casing yieldingly resisting inward movement of the shoes, wherein retaining means is provided for the wedge and has shouldered engagement with the wedge and shouldered engagement with recesses in the inner casing wall surface.

A more general object of this invention is to provide a friction draft gear of the wedge and shoe type in which maximum clearance is provided for the insertion, through the open end of the casing, of springs or other parts within the casing.

Another object of this invention is to provide simple and effective means of retaining the various parts of a draft gear of the class above described in assembled relationship prior to installation of the gear in a railway vehicle.

A further object of the present invention is to provide an effective retaining means for the wedge of such draft gear that facilitates quick assembly of the gear.

Still another object of this invention is to provide a multiple-legged retainer having a head portion engageable with the wedge of a draft gear and inwardly extending leg portions which are engageable in recesses formed on the inner surface of the casing thereof.

An additional object of this invention is to provide an economical, easily assembled, and trouble-free shock absorbing mechanism with high maximum capacity and low space requirements for use in railway draft riggings or the like.

Still other and further objects of the present invention will be obvious to the person skilled in the art upon examination of the accompanying drawings and reading of the specification and claims following hereinafter.

Figure 1:
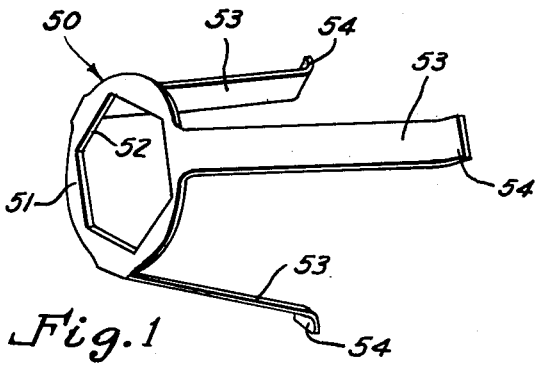
FIGURE 1 is a perspective view of the resilient retainer of the embodiment according to this invention.

Referring now in greater detail to the drawings, in which like numerals designate like elements, a generally cylindrical casing or housing 10 of hexagonal cross-section (FIGURE 2) serves as a friction shell and spring cage for cooperation with a wedge 20, three friction shoes 30, 30, 30, two springs 40 and 41 (FIGURE 3), and a retainer member 50.

The casing 10 is formed with a thick-walled front section or friction shell 11 of rounded hexagonal cross-section, the inner friction surfaces 12 of the shell 11 tapering slightly from its open front end and converging toward the rear of the shell. Rearward of the shell 11 and integral therewith is a generally tapered transition section 13 in which the wall thickness diminishes toward a rear section 15 of uniformly thinner walls. Eight horizontally oriented fins 17 (as in FIGURE 2) merge from the outer surfaces of the rear section 15 and angle outwardly to support an enlarged rectangular rear wall 16 and complete the casing. The rear wall 16 is thus suitably laterally extended and reinforced to adapt it to function as the rear follower of the mechanism. Three wedge-shaped notches 18 (FIGURE 3) are provided in the transition section 13 in such manner as to provide narrow forward extensions of the wall thicknesses of the rear section 15 and narrow radial shoulders 18' at the rear of the friction shell 11. A protrusion 19 inwardly from the center of the rear wall 16 is provided to receive and position the spring 41.

The wedge 20 is of generally circular cross-section anteriorly, tapering outward and rearward to a rounded hexagonal cross-section about half way back. Its front surface 21 is flat and slightly raised to form a hexagonal boss. The front central portion 22 is hollowed out and cup-shaped. The rear half comprises six friction surfaces 23 that converge sharply toward the rear and are constantly engaged with the shoes 30, 30, 30.

The three friction shoes 30, 30, 30 are disposed between the wedge 20 and the friction shell 11. In operation, as the wedge moves axially rearward with respect to the casing 10, the shoes slide rearward along the friction surfaces of the shell 12 and along the friction surfaces 23 of the wedge. Each shoe has a generally flat frontmost surface 31 (FIGURE 2) flanked by two rearwardly slanting wing portions 32 whose outer friction surfaces 33 mate with adjacent segments of the friction shell surface 12. The inner friction surfaces 34 of the shoes mate with the friction surfaces 23 of the wedge. The rear surfaces of the shoes are recessed at 35 to provide a seat for spring 41 and at 36 to provide a seat for spring 40.

Spring 40 has an outer diameter only slightly less than the inner diameter of friction shell 11 and is maintained in a precompressed condition between the rear wall 16 and the shoes 30, 30, 30. Spring 41 is of smaller diameter and nested co-axially within spring 40. It, too, is constantly in compression between the rear wall 16 and the shoes 30, 30, 30.

The retainer 50 is formed of flat spring steel and is provided with a circular head 51 having a hexagonal opening 52 adapted to mate with the hexagonal boss 21 on the front surface of the wedge 20. Three legs 53 extend rearwardly and outwardly from the periphery of the head 51, each terminating in an out-turned flange 54. In the assembled friction draft gear, the flanges 54 extend into the notches 18 in the tapered section 13 of the cylindrical casting 10, each flange 54 being urged against a shoulder 18' by the biasing actions of the springs 40 and 41 through shoes and wedge. The head 51 of the retainer fits snugly over the front of the wedge and limits its forward movement, thus maintaining all the components of the gear in assembled relation.

Figure 2:
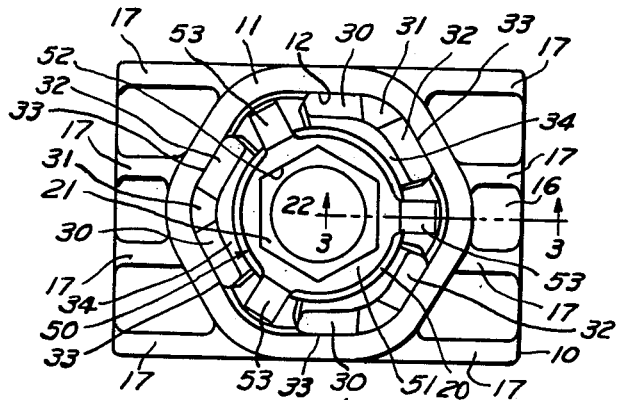
FIGURE 2 is an elevational end view of an assembled draft gear as seen from the open end of the friction casing.

To assemble the gear, the springs 40 and 41 are first inserted in the casing 10. Then the shoes 30, 30, 30 are positioned 120 degrees apart within the casing, each nestled in a corner of the hexagonal friction shell 11. The shoes are then depressed into the casing against the spring resistance while the wedge 20 and retainer 50 are inserted. The retainer legs 53 are urged radially inward to pass through the friction shell 11 until the flanges 54 are opposite the notches 18. At that point the legs 53 are permitted to resiliently move radially outward to positively engage the flanges 54 thereof behind the shoulders 18'. The shoes are then released and allowed to move forward. If desired, a continuous 360° shoulder could be substituted for the circumferentially spaced shoulders 18' defined by the notches 18. The shoes, 30, 30, 30, their wing portions 32, and the retainer legs 53 are so proportioned that the legs pass between adjacent shoes and do not interfere with the sliding action of the shoes. As shown in FIGURE 2, the clearance between the legs and the shoes is ample with such clearance being maintained during operation of the gear as a result of the hexagonal connection of the retainer 50 to the wedge 20.

The retainer 50 may be readily disassembled from the draft gear to facilitate and service of same by means of a suitable tool (not shown) which is adapted to flex the retainer legs 53 radially inwardly and out of engagement with the shoulders 18'.

It should be noted that the notches 18 are positioned far enough back in the casing that they do not reduce the wall thickness where it is required for strength purposes. The large outward forces developed by the shoes 30, 30, 30 on the shell 11 in repsonse to high shock loads on the wedge face 21 are resisted by a shell 11 of unbroken and almost uniform thickness. The notches 18 are positioned to the rear of the friction bore surfaces 12. During operation of the draft gear, the retainer is permitted to slide back and forth with the wedge 20. In this regard, the normal unstressed orientation of the retainer legs 53 preferably, and to minimize wear, should not define a circle large enough to cause resilient contact with the inner surface of the casing 10 while the flanges 54 are in their notches 18.

Figure 3:
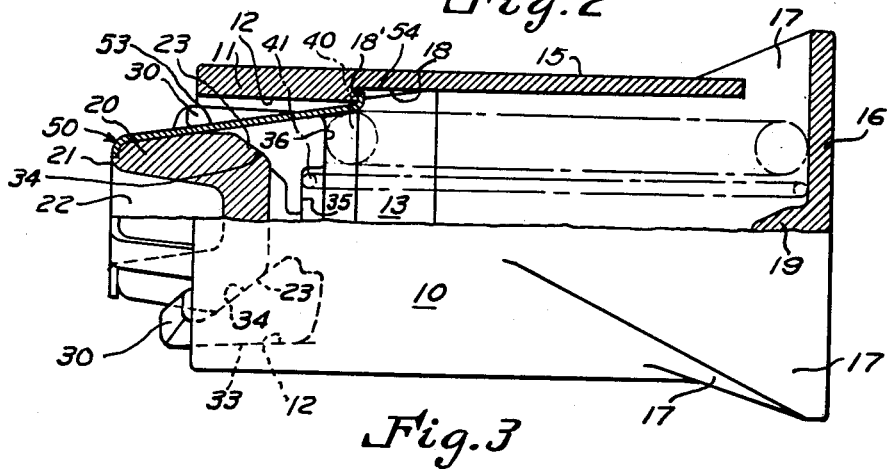
FIGURE 3 is a bottom plan view of the assembled draft gear, the upper half of the figure being a sectional view taken along the section line 3—3 of FIGURE 2.

As can be seen in FIGURE 3, the outer spring 40 extends sufficiently far forward to abut the inner surfaces of the retainer legs 53 and provide additional security against their being jarred inwardly and disengaged from their shoulders 18' or from within the notches 18.

Thus, the hereinbefore described mechanism can be seen to permit easy assembly, to allow the use of spring diameters limited only by the inner diameter of the friction shell, to permit simplification of the casing and wedge castings, to provide high capacity for its over all size and weight, to supply reliable maintenance of the assembled orientation during shipping and prior to installation, and to avoid troubles that might arise from interference of the pre-installation assembly-retaining means with the post-installation operating conditions.

It is obvious that numerous changes and modifications may be made in the described mechanism without departing from the spirit or scope of the present invention, and it is not intended to limit the coverage of the appended claims to the details of the foregoing disclosure.

What is claimed is:

1. In a friction shock absorbing mechanism having a casing open at its front end, a plurality of friction shoes slidingly telescoped within the casing, a central wedge in wedging engagement with the shoes, and resilient means within the casing opposing inward movement of the wedge and shoes; retaining means for limiting the outward movement of said wedge and comprising a head portion engageable with said wedge and a plurality of resilient leg portions integral with said head portion and extending rearwardly therefrom, each of said leg portions terminating in an outwardly projecting flange portion, said casing having a notched inner wall adapted to receive said flange portions and latch therewith to restrain said retaining means from outward movement with respect to said casing.

2. In a friction shock absorbing mechanism having a casing open at its front end, a plurality of friction shoes slidingly telescoped within the casing, a wedge in wedging engagement with the shoes, and resilient means within the casing opposing inward movement of the wedge and shoes; retaining means for limiting the outward movement of said wedge and comprising a front portion positively engaging said wedge, a plurality of rearwardly extending resilient leg portions integral with said front portion, said casing being provided with internal shoulder configuratons spaced from its front end, each of said leg portions being formed at its rearward end to latchingly engage one of said shoulder configurations whereby to limit the forward movement of said retaining means and said wedge with respect to said casing.

3. Mechanism as set forth in claim 2 wherein adjacent ones of said shoes sandwich each of said leg portions therebetween, the areas of engagement of said retaining means with said wedge and with said casing each being of mating configuration with the part engaged whereby said retaining means is anchored against rotational movement relative thereto.

4. Friction shock absorbing mechanism comprising a generally cylindrical casing open at its front end, said casing having a thick-walled front section, an intermediate tapered section, and a thin-walled rear section; a plurality of friction shoes mounted within said front section for sliding engagement with respect thereto, a wedge protruding from said front end and positioned for wedging engagement with said shoes, spring means within said casing urging said shoes and said wedge frontwards, and assembly-retaining means adapted to engage said wedge and said casing and limit the frontwards movement of said wedge with respect to said casing, said tapered section having a plurality of shoulders and said assembly-retaining means having a corresponding plurality of legs extending rearwardly from the area of its engagement with said wedge, each of said legs being adapted for positive latching engagement with its corresponding shoulder.

5. The combination set forth in claim 4 wherein said spring means is of a diameter only slightly less than the inscribing circumference of said front section.

6. The combination set forth in claim 4, wherein said legs are elastically flexible in the radial direction of the casing.

7. Friction shock absorbing mechanism comprising a generally cylindrical casing open at its front end, said casing having a thick-walled front section, an intermediate tapered section, and a thin-walled rear section; a plurality of friction shoes mounted within said front section for sliding engagement with respect thereto, a wedge protruding from said front end and positioned for wedging engagement with said shoes, spring means within said casing urging said shoes and said wedge forward, and assembly-retaining means adapted to engage said wedge and said casing and limit the forward movement of said wedge with respect to said casing, said tapered section having at least one area of reduced wall thickness, said area providing a shoulder, the rear extremity of said assembly-retaining means being formed to mate with and engage said shoulder, said extremity diverging from the axis of said casing in its normal unstressed orientation to a radial distance greater than the radius of the front section but less than that of said reduced wall thickness area.

8. A friction shock absorbing mechanism comprising, in combination, a casing open at one end, a plurality of friction shoes slidingly telescoped in said one end of the casing, a central wedge in wedging engagement with outer surface portions of said shoes, a coil spring within the casing for resiliently urging said wedge and shoes outwardly thereof, shoulder means formed on the inner surface of said casing inwardly of said open end thereof, and retaining means for limiting the outward movement of said wedge characterized by a head portion engageable with said wedge and by a plurality of leg portions integral with said head portion and extending inwardly of said casing, each of said leg portions being yieldable radially of said casing and terminating in an outwardly projecting flange adapted for shouldered engagement with said shoulder means whereby to limit outward movement of said retaining means relative to said casing, the inner surfaces of the inner ends of said leg portions being engaged by the outermost end coil of said spring to aid in preventing inward radial yielding of said leg portions and thus to aid in retaining said flanges in shouldered engagement with said shoulder means in said casing.

References Cited in the file of this patent
UNITED STATES PATENTS

| | | |
|---|---|---|
| 2,713,425 | Tucker | July 19, 1955 |
| 3,061,083 | Hubbell | Oct. 30, 1962 |